June 10, 1947.   V. HAENSEL ET AL   2,421,936
PRODUCTION OF OCTENES
Filed April 23, 1943
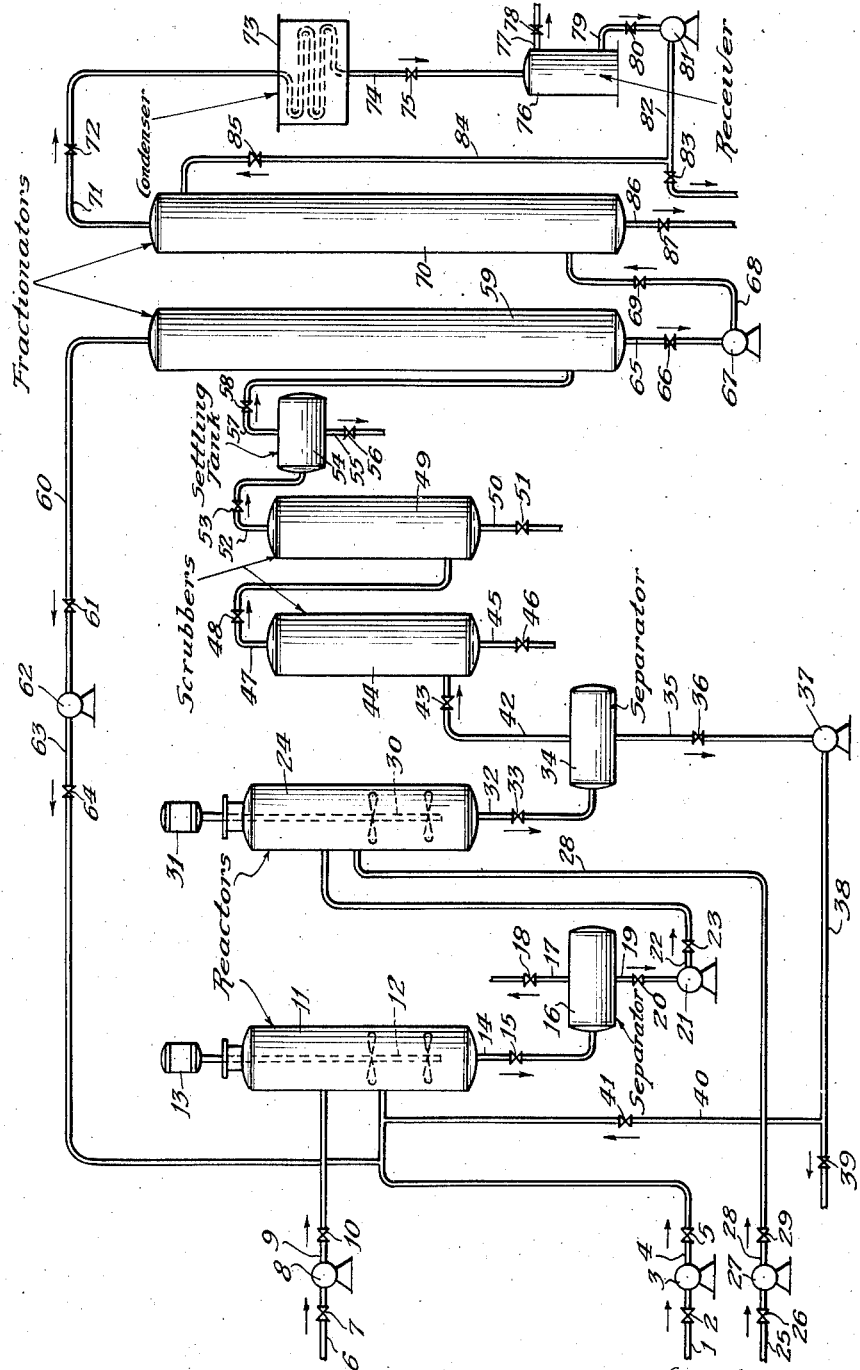
Inventors:
Vladimir Haensel
Vladimir N. Ipatieff
By: Lee J. Gary
Attorney.

Patented June 10, 1947

2,421,936

UNITED STATES PATENT OFFICE 2,421,936

PRODUCTION OF OCTENES

Vladimir Haensel and Vladimir N. Ipatieff, Riverside, Ill., assignors to Universal Oil Products Company, Chicago, Ill., a corporation of Delaware Application April 23, 1943, Serial No. 484,215

9 Claims. (Cl. 260—682)

This invention relates to a process for the preparation of octenes hydrogenatable to 2,2,3- and 2,3,4-trimethylpentanes.

An object of this invention is the conversion of normal butylenes and tertiary butyl alcohol into relatively high yields of octenes hydrogenatable to 2,2,3- and 2,3,4-trimethylpentanes with relatively low formation of diisobutylenes.

In one specific embodiment the present invention relates to a process for producing high yields of octenes hydrogenatable to 2,2,3- and 2,3,4-trimethylpentanes which comprises reacting normal butylenes with sulfuric acid of from about 60 to about 85% concentration at a temperature of from about 40° to about 100° C. to form a catalyst layer containing absorbed normal butylenes, slowly introducing tertiary butyl alcohol to said catalyst layer to effect reaction between said tertiary butyl alcohol and the absorbed butylenes to form a polymer product and to regenerate sulfuric acid, separating said polymer from said sulfuric acid, and fractionally distilling said polymer to separate octenes hydrogenatable to 2,2,3- and 2,3,4-trimethylpentanes from higher boiling olefins.

Previous methods for producing octenes hydrogenatable to 2,2,3- and 2,3,4-trimethylpentanes comprise contacting a mixture of tertiary butyl alcohol and secondary butyl alcohol with sulfuric acid of 65% concentration at 80° C. Also polymers containing octenes hydrogenatable to relatively high yields of 2,2,4-trimethylpentane containing smaller amounts of 2,2,3- and 2,3,4-trimethylpentanes have been produced by treating mixtures of isobutylene and normal butylene at about 60° C. to about 80° C. in the presence of sulfuric acid of from about 65 to about 75% concentration, but when these methods are employed relatively large proportions of the tertiary butyl alcohol and isobutylene yield di-isobutylene rather than the desired mixed polymers which we herein refer to as 2,2,3- and 2,3,4-trimethylpentenes since they are hydrogenatable to 2,2,3- and 2,3,4-trimethylpentanes.

Therefore, the present process has the advantage of providing a suitable means for producing higher yields of these desired octenes by improved methods of operation. The present process also makes it possible to separate normal butane from the reaction mixture without further fractional distillation treatment.

The starting materials for the present process are obtainable from any source. Thus normal butylenes may be formed by dehydrating normal or secondary butyl alcohol, or a mixture of normal butanes and normal butylenes may be obtained by dehydrogenation of normal butane. However, the butane-butylene fraction of cracked gases, which is the starting material generally more readily available in relatively large quantities, may be fractionally distilled to separate therefrom a relatively low boiling fraction comprising essentially butylene-1, isobutylene, and isobutane; and a relatively higher boiling fraction consisting essentially of butylene-2 and normal butane. The last-named fraction may be reacted with sulfuric acid as hereinabove set forth to form a sulfuric acid-normal butylene reaction product which is believed to consist of secondary-butyl hydrogen sulfate also called secondary-butyl sulfate dissolved in sulfuric acid although this concept should not be construed to limit the broad scope of the invention. The relatively lower boiling fraction containing isobutylene, butylene-1, and isobutane may be reacted with the sulfuric acid-normal butylene reaction product to form octenes and higher polymers; but it is preferable to convert the isobutylene content of the lower boiling fraction into tertiary butyl alcohol by suitable means and then to utilize the tertiary butyl alcohol in the process of this invention as hereinabove set forth.

The essential features of the present invention are illustrated more fully in the attached diagrammatic drawing which shows in general side elevation an arrangement of apparatus in which the process may be carried out.

Normal butylene or a butane-butylene fraction substantially free from isobutylene is introduced through line 1 and valve 2 to pump or compressor 3 which discharges through line 4 and valve 5 into reactor 11. A sulfuric acid solution of from about 60 to about 85% concentration is introduced through line 6 and valve 7 to pump 8 which discharges through line 9 and valve 10 into reactor 11. In reactor 11 the sulfuric acid is commingled with the normal butylene mixture introduced thereto from line 4 as hereinabove set forth. Reactor 11 comprises any suitable vessel in which the sulfuric acid and normal butylenes may be contacted. It may thus comprise a vertical cylindrical reactor provided with a stirrer 12 operated by motor 13 or other suitable prime mover.

From reactor 11 the reaction mixture consisting of sulfuric acid, absorbed butylenes, and butane is directed through line 14 and valve 15 to separator 16 in which unabsorbed butane is separated from the sulfuric acid containing absorbed normal butylenes. The butane is directed from separator 16 through line 17 and valve 18 to waste or to further use not illustrated in the diagrammatic drawing; while the sulfuric acid layer containing absorbed normal butylenes is withdrawn through line 19 and valve 20 by pump 21 which discharges through line 22 and valve 23 into reactor 24 in which it is reacted with tertiary butyl alcohol introduced as hereinafter set forth.

Tertiary butyl alcohol is admitted through line 25 and valve 26 to pump 27 which discharges through line 28 and valve 29 into reactor 24 in which it is commingled with the sulfuric acid-normal butylene reaction product obtained from reactor 11. Reactor 24 is also equipped with stirrer 39 driven by motor 31 or some other suitable prime mover. Reactor 24 is maintained at a temperature of from about 40° to about 100° C. in order to effect reaction between the normal butylenes absorbed or dissolved in the sulfuric acid catalyst or present therein and the tertiary butyl alcohol to produce mixed polymers relatively rich in 2,2,3- and 2,3,4-trimethylpentenes which are the names herein used in referring to the octenes which are hydrogenatable to 2,2,3- and 2,3,4-trimethylpentanes.

From reactor 24 the reaction mixture of sulfuric acid and polymers is directed through line 32 and valve 33 to separator or settling tank 34 in which the polymers separate as an upper layer from the relatively heavier used sulfuric acid. The sulfuric acid which collects in separator 34 is less concentrated than that employed in reactor 11 due to dilution by water derived from the tertiary butyl alcohol introduced to reactor 24. The used sulfuric acid solution which may contain some absorbed normal butylenes possibly in the form of secondary-butyl sulfate is withdrawn from separator 34 through line 35 and valve 36 by pump 37 which discharges through line 38 containing valve 39. At least a portion of the used sulfuric acid is recycled from line 38 through line 40 and valve 41 to line 4, already mentioned, through which fresh normal butylene is introduced to reactor 11. Fresh sulfuric acid is introduced through lines 6 and 9 to reactor 11 in an amount sufficient to compensate for the used sulfuric acid withdrawn from the process and for the dilution by the recycled sulfuric acid.

The mixture of polymer product and dissolved butylene separated as an upper layer in separator 34 is directed therefrom through line 42 and valve 43 to scrubber 44 containing caustic soda solution employed for removing therefrom the entrained sulfuric acid. Caustic soda solution may be withdrawn periodically from scrubber 44 through line 45 and valve 46 when the caustic becomes spent with use, and fresh caustic soda solution may also be introduced through line 45 and valve 46. The polymer product is directed from scrubber 44 through line 47 and valve 48 to a second scrubber 49 containing water employed for freeing the polymer product from entrained caustic soda solution. Water may be introduced to or withdrawn from scrubber 49 by way of line 50 containing valve 51.

The washed polymer product is discharged from near the top of scrubber 49 through line 52 and valve 53 to settling tank 54 from which small amounts of water are withdrawn through line 55 and valve 56. The washed polymer product is directed from settling tank 54 through line 57 and valve 58 to fractionator 59 employed as a stabilizer to substantially free the polymer from unconverted normal butylenes. The butylenes so separated from the polymer product are directed from the top of fractionator 59 through line 60 and valve 61 to compressor 62 which discharges through line 63 and valve 64 into line 4, already mentioned, through which the fresh normal butylene or normal butylene-containing fraction is charged to reactor 11. The polymer product so freed from butylenes is withdrawn from fractionator 59 through line 65 and valve 66 by pump 67 which discharges through line 68 and valve 69 into the lower portion of fractionator 70 of suitable design for separating octenes from higher boiling polymers. Octene vapors are directed from near the top of fractionator 70 through line 71 and valve 72 to condenser 73 from which the liquid octenes pass through rundown line 74 and valve 75 to receiver 76 equipped with conventional gas release line 77 containing valve 78. The liquid polymers are withdrawn from receiver 76 through line 79 and valve 80 by pump 81 which discharges through line 82 containing valve 83. A portion of the polymers being discharged through line 82 are directed therefrom through line 84 and valve 85 to near the top of fractionator 70 to serve as reflux liquid and assist in the fractionation therein.

The polymer products boiling higher than octenes are withdrawn from fractionator 70 through line 86 and valve 87 to cooling and storage not illustrated in the attached drawing.

The process of this invention is also applicable to the treatment of primary and secondary olefins (which may be referred to as non-tertiary olefins) of higher molecular weights than butylenes with sulfuric acid to form a sulfuric acid layer containing absorbed olefins and the further treatment of said sulfuric acid layer with a tertiary alcohol to form polymers with highly branched chain structures some of which may include tripytyl configurations of carbon atoms. By a triptyl configuration of carbon atoms we mean an arrangement of a quaternary carbon atom adjacent to a tertiary carbon atom.

Although sulfuric acid is preferred as catalyst for reaction of non-tertiary olefins and tertiary alcohols, it is also within the scope of our invention to employ similarly another mineral acid such as phosphoric acid or a mixture of sulfuric acid and phosphoric acid.

The following example is given to illustrate the character of results obtained by the present process, although it is not intended to thereby limit the generally broad scope of the invention.

215 cc. of 96% sulfuric acid was diluted by addition of 110 cc. of water to produce approximately 320 cc. of sulfuric acid of 75% concentration. The 75% sulfuric acid was placed in an autoclave equipped with an agitator generally called a turbomixer and approximately 250 cc. of liquid butylene-2 was then charged to the autoclave at a temperature of 30° C. After the butylene-2 had been charged the temperature increased rapidly to 70° C. because of the heat of reaction and the pressure increased to 60 pounds per square inch. After the reaction mixture was agitated for about 10 minutes, the pressure decreased to substantially atmospheric and the temperature dropped to approximately 66° C. At that point tertiary butyl alcohol was introduced slowly to the reaction mixture. A total of 175 cc. of tertiary butyl alcohol was so introduced during a period of about 4 hours while the reactor temperature was maintained between 67° and 70° C. After the tertiary butyl alcohol had been so charged the reaction mixture was cooled to about 10° C., removed from the autoclave, and separated into approximately 255 cc. of a hydrocarbon layer and 375 cc. of an acid layer. The hydrocarbon layer was washed with water and with sodium carbonate solution and finally dried by means of calcium chloride. Distillation of the washed hydrocarbon layer showed that it contained approximately 6% of butylene-2, 63.7% of octenes boiling between 103° and 120° C., and 30.3% of higher polymers. A total of 180 grams of octenes and higher polymers was thus obtained. Upon the basis of the isobutylene available from the tertiary butyl alcohol charged, this yield of polymers was 182%.

The octene fraction was hydrogenated in the presence of a nickel catalyst at 80° C. under an initial pressure of 100 atmospheres. The substantially saturated product so produced contained approximately 2.6% of 2,2,4-trimethylpentane, 68.2% of 2,2,3-trimethylpentane, and 29.2% of 2,3,4-trimethylpentane. These results show that 2,2,3-trimethylpentenes are the principal products of the reaction between normal butylenes and tertiary butyl alcohol conducted according to the present invention.

The nature of the present invention and its commercial utility are evident from the specification and example given, although neither section is intended to unduly limit its generally broad scope.

We claim as our invention:

1. A process for producing olefin polymers of highly branched chain structures which comprises absorbing in a first step a non-tertiary olefin of at least four carbon atoms per molecule in a mineral acid polymerizing catalyst, subsequently in a second step introducing a tertiary alcohol in free unabsorbed form to the mineral acid catalyst containing the absorbed olefin and reacting said alcohol with the absorbed olefin in the absence of unabsorbed olefin, and separating the resultant hydrocarbon polymer from the catalyst.

2. A process for producing 2,2,3- and 2,3,4-trimethylpentenes which comprises absorbing in a first step a normal butylene in sulfuric acid of from about 60% to about 85% concentration, subsequently in a second step introducing tertiary butyl alcohol in free unabsorbed form to said acid containing the absorbed butylene and reacting said alcohol with the absorbed butylene in the absence of unabsorbed olefin to form olefinic polymers, and separating the latter from the acid.

3. A process for producing 2,2,3- and 2,3,4-trimethylpentenes which comprises reacting in a first step normal butylene with sulfuric acid to form an acid phase containing absorbed normal butylene, subsequently in a second step introducing tertiary butyl alcohol in free unabsorbed form to said acid phase containing the absorbed butylene and reacting said alcohol with said acid phase in the absence of free olefins, and separating the resultant polymer from regenerated sulfuric acid.

4. A process for producing 2,2,3- and 2,3,4-trimethylpentenes which comprises reacting in a first step normal butylene and sulfuric acid of from about 60 to about 85% concentration at a temperature of from about 40° to about 100° C. to form a catalyst layer containing absorbed normal butylene, subsequently in a second step introducing tertiary butyl alcohol in free unabsorbed form to said catalyst layer and reacting said alcohol with said catalyst layer in the absence of unabsorbed olefin, and separating the resultant polymer from regenerated sulfuric acid.

5. A process for producing 2,2,3- and 2,3,4-trimethylpentenes which comprises reacting a normal butane-normal butylene fraction with sulfuric acid in a first reaction zone to form a catalyst layer containing absorbed normal butylene, separating said catalyst layer from unconverted normal butane, introducing the separated catalyst layer and free unabsorbed tertiary butyl alcohol into a second reaction zone and therein reacting said alcohol with said catalyst layer in the absence of unabsorbed olefin, separating the resultant polymer from the regenerated sulfuric acid, and fractionally distilling said polymer to separate 2,2,3- and 2,3,4-trimethylpentenes from higher boiling olefins.

6. A process for producing 2,2,3- and 2,3,4-trimethylpentenes which comprises reacting in a first reaction zone a normal butane-normal butylene fraction with sulfuric acid of from about 60 to about 85% concentration at a temperature of from about 40° to about 100° C. to form a catalyst layer containing absorbed normal butylene, separating said catalyst layer from unconverted normal butane, introducing the separated catalyst layer and free unabsorbed tertiary butyl alcohol into a second reaction zone and therein reacting said alcohol with said catalyst layer in the absence of unabsorbed olefin, and separating the resultant polymer consisting predominantly of 2,2,3- and 2,3,4,-trimethylpentenes from regenerated sulfuric acid.

7. A process for producing 2,2,3- and 2,3,4-trimethylpentenes which comprises reacting a normal butane-normal butylene fraction with sulfuric acid in a first reaction zone to form a catalyst layer containing absorbed normal butylene, separating said catalyst layer from unconverted normal butane, introducing the separated catalyst layer and free unabsorbed tertiary butyl alcohol into a second reaction zone and therein reacting said alcohol with said catalyst layer in the absence of unabsorbed olefin, separating the resultant polymer from regenerated sulfuric acid, recycling at least a portion of said regenerated sulfuric acid to contact with the normal butane-normal butylene fraction in said first reaction zone, and fractionally distilling said polymer to separate 2,2,3- and 2,3,4-trimethylpentenes from higher boiling olefins.

8. A process for producing 2,2,3- and 2,3,4-trimethylpentenes which comprises reacting in a first reaction zone a normal butane-normal butylene fraction with sulfuric acid of from about 60 to about 85% concentration at a temperature of from about 40° to about 100° C. to form a catalyst layer containing absorbed normal butylene, separating said catalyst layer from unconverted normal butane, introducing the separated catalyst layer and free unabsorbed tertiary butyl alcohol into a second reaction zone and therein reacting said alcohol with said catalyst layer in the absence of unabsorbed olefin, separating the resultant polymer from regenerated sulfuric acid, recycling at least a portion of said regenerated sulfuric acid to contact with the normal butane-normal butylene fraction in said first reaction zone, and fractionally distilling said polymer to separate 2,2,3- and 2,3,4-trimethylpentenes from higher boiling olefins.

9. A process for producing 2,2,3- and 2,3,4-trimethylpentenes which comprises, absorbing normal butylene in sulfuric acid in a first step to form a reaction mixture of sulfuric acid and absorbed butylene, subsequently in a second step introducing tertiary butyl alcohol in free unabsorbed form to said reaction mixture and reacting said alcohol with said reaction mixture at a temperature of from about 40° to about 100° C. in the absence of unabsorbed olefin, and separating the resultant polymer containing a relatively high proportion of 2,2,3- and 2,3,4-trimethylpentenes.

VLADIMIR HAENSEL.
VLADIMIR N. IPATIEFF.

REFERENCES CITED

The following references are of record in the file of this patent:

UNITED STATES PATENTS

| Number | Name | Date |
|---|---|---|
| 2,181,640 | Deanesly et al. (A) | Nov. 28, 1939 |
| 2,012,785 | Deanesly et al. (B) | Aug. 27, 1935 |
| 2,171,928 | Gage | Sept. 5, 1939 |
| 2,156,718 | Bent | May 2, 1939 |
| 2,293,353 | Moravec | Aug. 18, 1942 |
| 2,300,817 | Sweeney | Nov. 3, 1942 |
| 2,334,861 | Bowles | Nov. 23, 1943 |
| 2,348,017 | Miller | May 2, 1944 |

OTHER REFERENCES

Whitmore article in Jour. Amer. Chem. Soc.; vol. 63; Mar. 1941; pages 756 and 757.